United States Patent [19]
Hartwig

[11] Patent Number: 5,228,752
[45] Date of Patent: Jul. 20, 1993

[54] TUNNEL BORING MACHINE

[75] Inventor: Sverker Hartwig, Täby, Sweden

[73] Assignee: Atlas Copco Construction and Mining Technique AB, Stockholm, Sweden

[21] Appl. No.: 802,334

[22] Filed: Dec. 4, 1991

[30] Foreign Application Priority Data

Dec. 13, 1990 [SE] Sweden .............................. 9003979

[51] Int. Cl.⁵ ........................ E21D 9/10; F16C 17/10
[52] U.S. Cl. ...................................... 299/31; 405/138
[58] Field of Search ........................ 299/31, 33, 56, 55, 299/58; 405/138

[56] References Cited

U.S. PATENT DOCUMENTS

| 3,383,138 | 5/1968 | Scaravilli et al. | 299/31 |
| 4,189,186 | 2/1980 | Snyder | 299/31 |
| 5,125,719 | 6/1992 | Snyder | 299/31 |

FOREIGN PATENT DOCUMENTS 538133  3/1977  U.S.S.R. .............................. 299/31

Primary Examiner—David J. Bagnell
Attorney, Agent, or Firm—Eric Y. Munson; Mark P. Stone

[57] ABSTRACT

Tunnel boring machine whose driving shaft (4) adjacent to the boring head (6) is journalled in a bearing (12) which is intended to take up only radial forces. Shaft (4) is at its other end journalled in bearings (13,14) which take up both radial and axial forces.

7 Claims, 1 Drawing Sheet

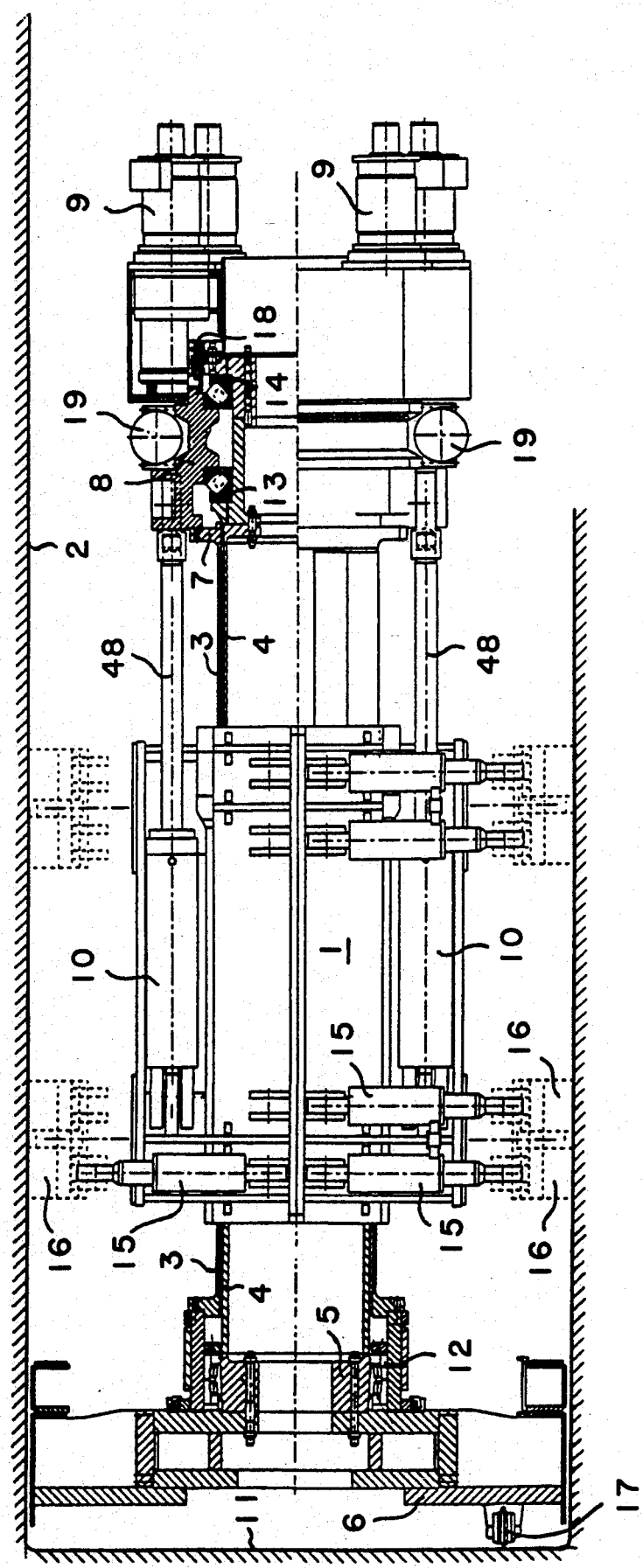

TUNNEL BORING MACHINE

BACKGROUND OF THE INVENTION

The present invention relates to a tunnel boring machine, i.e. a machine by means of which a tunnel is bored to full area without using explosives.

It has long been a desire to be able to construct machines of the above mentioned kind for different tunnel diameters and thereby use module designs which are the same for the different tunnel diameters. Machines designed according to these ideas would be substantially cheaper because fewer parts need be specially designed for individual machines. Machines which comply with the above mentioned desire must have a driving shaft for the boring head which can stand the torque which the biggest machine requires. This gives a large diameter. At the same time the bearing adjacent to the boring head must admit passage, for instance for exchange of boring tools, in the smallest contemplated tunnel diameter.

SUMMARY OF THE INVENTION

The present invention, aims at achieving a tunnel boring machine which admits the mounting of boring heads with comparatively different diameters on the same driving shaft. This is achieved by, contrary to prior art, journalling the driving shaft for the boring head in a bearing adjacent to the boring head which is only intended for radial forces. Through this a substantial diameter reduction of the design is obtained directly behind the boring head. The axial forces are transferred from the machine housing via bearings at the rear end of the machine to the rotational shaft for the boring head and from there to the boring head.

BRIEF DESCRIPTION OF THE DRAWING

An embodiment of the invention is described below with reference to the accompanying drawing which schematically shows a section through a tunnel boring machine according to the invention.

DESCRIPTION OF THE PREFERRED EMBODIMENT OF THE INVENTION

The tunnel boring machine shown in the drawing comprises a machine housing 1 which by means of hydraulic cylinders 15 and clamping shoes 16 is clampable in a tunnel 2. A shell 3 is movable to-and-fro in the machine housing and prevented from rotation about its longitudinal axis by the machine housing. In shell 3 a shaft 4 is rotatably journalled. Shaft 4 carries at its front end 5 a boring head 6 which is provided with a number of cutters 17, one shown, for the working of a tunnel front 11. Shaft 4 is at its front end journalled, by means of a bearing 12, in the shown example a spherical roller bearing, which is only intended for the taking up of radial forces, in shell 3. Shell 3 is supported adjacent to bearing 12 by a not shown support foot. The drawing shows the tunnel boring machine from above making the support foot obscured. Shell 3 is at its end 7 far from the boring head provided with a gear box 8 on which a number of driving motors 9 are arranged. Shaft 4 is by means of bearings 13,14, in the shown example conical roller bearings, journalled in the gear box 8. These bearings are intended for the taking up of both radial and axial forces. The outgoing shafts of the driving motors transfer torque via the gear wheel 18 to shaft 4. In order to press boring head 6 against the tunnel front 11 a number of pressure fluid cylinders 10 provided with piston rods 48 are arranged between machine housing 1 and shaft 4 via gear box 8. Gear box 8 is provided with two hydraulic cylinders 19 which carry not shown support feet.

In order to adjust the machine to different tunnel diameters boring head 6 can be exchanged, driving motors 9 can be exchanged or the number of driving motors can be changed. Furthermore, the number of clamping shoes 16 can be adjusted to the transferred torque.

I claim:

1. Tunnel boring machine comprising a machine housing (1) which is clampable in a tunnel (2), a shell (3) movable to-and-fro in the machine housing, a shaft (4) rotatably arranged in said shell, a boring head (6) carried at one end (5) of said shaft, said shell being provided with a gear box (8) at an end (7) of said shell remote from said boring head, said gear box including a plurality of driving motors (9) arranged thereon, said shaft being rotatably journalled relative to said shell and a plurality of pressure fluid cylinders (10) being arranged between said machine housing and said shaft for pressing said boring head against a tunnel front (11), wherein said shaft (4) adjacent to the boring head (6) is journalled in said shell (3) by means of a bearing (12) which is intended to only take up radial forces and said shaft at said gear box (8) is journalled by means of bearings (13, 14) which take up both radial and axial forces.

2. The tunnel boring machine as claimed in claim 1 further comprising a plurality of clamping shoes (16) extending from said machine housing.

3. The tunnel boring machine as claimed in claim 2 including means for adjusting the number of said plurality of said clamping shoes.

4. The tunnel boring machine as claimed in claim 1 further including means for exchanging said plurality of driving motors (9) arranged on said gear box (8).

5. The tunnel boring maching as claimed in claim 1 further including means for varying the number of said plurality of driving motors arranged on said gear box (8).

6. The tunnel boring machine as claimed in claim 1 further including a piston rod (48) provided in each of said pressure fluid cylinders (10) for pressing said boring head against said tunnel front.

7. The tunnel boring machine as claimed in claim 1 further including gear wheels (18) arranged for coupling said driving motors (9) to said shaft (4) for transfer of torque.

* * * * *